United States Patent
Huang et al.

(10) Patent No.: US 11,620,532 B2
(45) Date of Patent: Apr. 4, 2023

(54) METHOD AND APPARATUS FOR GENERATING NEURAL NETWORK

(71) Applicant: Beijing Baidu Netcom Science and Technology Co., Ltd., Beijing (CN)

(72) Inventors: Jianhui Huang, Beijing (CN); Min Qiao, Beijing (CN); Zhifan Feng, Beijing (CN); Pingping Huang, Beijing (CN); Yong Zhu, Beijing (CN); Yajuan Lyu, Beijing (CN); Ying Li, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 718 days.

(21) Appl. No.: 16/665,882

(22) Filed: Oct. 28, 2019

(65) Prior Publication Data
US 2020/0293905 A1  Sep. 17, 2020

(30) Foreign Application Priority Data
Mar. 12, 2019  (CN) .......................... 201910184509.9

(51) Int. Cl.
*G06N 3/10* (2006.01)
*G06N 3/04* (2006.01)
*G06N 3/08* (2006.01)

(52) U.S. Cl.
CPC ............. *G06N 3/10* (2013.01); *G06N 3/0427* (2013.01); *G06N 3/08* (2013.01)

(58) Field of Classification Search
CPC ........... G06N 3/10; G06N 3/0427; G06N 3/08
See application file for complete search history.

(56) References Cited

U.S. PATENT DOCUMENTS

2018/0189634 A1  7/2018  Abdelaziz et al.
2019/0087724 A1*  3/2019  Park .......................... G06N 3/08

FOREIGN PATENT DOCUMENTS

CN  106127297 A  11/2016
CN  106776711 A   5/2017
(Continued)

OTHER PUBLICATIONS

Socher, Richard, et al. "Reasoning with neural tensor networks for knowledge base completion." Advances in neural information processing systems 26 (2013). (Year: 2013).*
(Continued)

*Primary Examiner* — Eric Nilsson
(74) *Attorney, Agent, or Firm* — Kilpatrick Townsend & Stockton LLP

(57) ABSTRACT

Embodiments of the present disclosure relate to a method and apparatus for generating a neural network. The method includes: acquiring a target neural network, the target neural network corresponding to a preset association relationship, and being configured to use two entity vectors corresponding to two entities in a target knowledge graph as an input, to determine whether an association relationship between the two entities corresponding to the inputted two entity vectors is the preset association relationship, the target neural network comprising a relational tensor predetermined for the preset association relationship; converting the relational tensor in the target neural network into a product of a target number of relationship matrices, and generating a candidate neural network comprising the target number of converted relationship matrices; and generating a resulting neural network using the candidate neural network.

15 Claims, 6 Drawing Sheets

(56) References Cited

FOREIGN PATENT DOCUMENTS

| | | |
|---|---|---|
| CN | 107662617 A | 2/2018 |
| CN | 107944559 A | 4/2018 |
| CN | 108280061 A | 7/2018 |
| JP | 2018-180935 A | 11/2018 |

OTHER PUBLICATIONS

Huang, Jian-Hui, et al. "Knowledge reasoning based on neural tensor network." ITM Web of Conferences. vol. 12. EDP Sciences, 2017. (Year: 2017).*

Xia, Long, et al. "Modeling document novelty with neural tensor network for search result diversification." Proceedings of the 39th International ACM SIGIR conference on Research and Development in Information Retrieval. 2016. (Year: 2016).*

Sun, Yarning, et al. "Modeling mention, context and entity with neural networks for entity disambiguation." Twenty-fourth international joint conference on artificial intelligence. 2015. (Year: 2015).*

Socher, Richard et al., "Reasoning With Neural Tensor Networks for Knowledge Base Completion," Stanford University, (Neural Information Processing Systems Foundation, Inc., pp. 1-12, (1987-2020).

Li, Guangxi, "Research on Relationships between Tensor Networks and Neural Networks," University of Electronic Science and Technology of China, School of Computer Science & Engineering, Master Thesis, pp. 1-72 (Jun. 23, 2018).

Ishihara, Takahiro et al., "Parameter reduction of neural tensor network based on eigenvalue decomposition," 24th Annual Meeting of Association for Natural Language Processing, The Association for Natural Language Processing, pp. 228-231, (Mar. 5, 2018).

Decision to Grant a Patent dated Jan. 7, 20222 of the corresponding Japanese patent application No. 2019-198129 (three pages).

Sun, Yaming et al., "Modeling Mention Context and Entity with Neural Networks for Entity Disambiguation," Harbin Institute of Technology, Harbin China; Microsoft Research, Beijing China; Proceedings of the Twenty-Fourth International Joint Conference on Artificial Intelligence (IJCAI); (2015); pp. 1333-1339.

* cited by examiner

METHOD AND APPARATUS FOR GENERATING NEURAL NETWORK

CROSS-REFERENCE TO RELATED APPLICATIONS

This application claims priority to Chinese Application No. 201910184509.9, filed on Mar. 12, 2019 and entitled "Method and Apparatus for Generating Neural Network," the entire disclosure of which is hereby incorporated by reference.

TECHNICAL FIELD

Embodiments of the present disclosure relate to the field of computer technology, and specifically to a method and apparatus for generating a neural network.

BACKGROUND

The knowledge graph is a network composed of a large number of structured triples. Nodes in the network represent entities, and an edge between nodes represents an association relationship between the entities.

At present, the knowledge graph may be applied to various fields, such as information search, and information recommendation. With the knowledge graph, other entities associated with an entity corresponding to a piece of information can be obtained, and then other information associated with the information can be obtained.

SUMMARY

Embodiments of the present disclosure present a method and apparatus for generating a neural network, and a method and apparatus for updating a knowledge graph.

In a first aspect, an embodiment of the present disclosure provides a method for generating a neural network, including: acquiring a target neural network, the target neural network corresponding to a preset association relationship, and being configured to use two entity vectors corresponding to two entities in a target knowledge graph as an input, to determine whether an association relationship between the two entities corresponding to the inputted two entity vectors is the preset association relationship, the target neural network including a relational tensor predetermined for the preset association relationship; converting the relational tensor in the target neural network into a product of a target number of relationship matrices, and generating a candidate neural network including the target number of converted relationship matrices; and generating a resulting neural network using the candidate neural network.

In some embodiments, the generating a resulting neural network using the candidate neural network includes: acquiring a training sample set for the preset association relationship, where the training sample set includes a positive training sample and a negative training sample, a training sample includes two sample entity vectors, the sample entity vector is used for characterizing a sample entity, an association relationship between two entities corresponding to the positive training sample is the preset association relationship, and an association relationship between two entities corresponding to the negative training sample is not the preset association relationship; and selecting a training sample from the training sample set, and executing following training: training the candidate neural network using the selected training sample; determining whether the training the candidate neural network is completed; and determining, in response to determining the training the candidate neural network being completed, the trained candidate neural network as the resulting neural network.

In some embodiments, the generating a resulting neural network using the candidate neural network further includes: reselecting, in response to determining the training the candidate neural network being uncompleted, a training sample from unselected training samples included in the training sample set, adjusting a parameter of the candidate neural network, and continuing to execute the training using a most recently selected training sample and a most recently adjusted candidate neural network.

In some embodiments, the acquiring a training sample set for the preset association relationship includes: acquiring a positive training sample set for the preset association relationship; determining, for a positive training sample in the positive training sample set, a to-be-retained sample entity vector and a to-be-replaced sample entity vector from the positive training sample; acquiring a sample entity vector for replacement for the to-be-replaced sample entity vector, where a sample entity corresponding to the sample entity vector for replacement is different from a sample entity corresponding to the to-be-replaced sample entity vector; and using the sample entity vector for replacement and the to-be-retained sample entity vector to form a negative training sample corresponding to the positive training sample; and using the positive training sample set and the formed negative training sample to form the training sample set.

In some embodiments, the method further includes: storing the resulting neural network.

In a second aspect, an embodiment of the present disclosure provides a method for updating a knowledge graph, including: acquiring two to-be-associated entity vectors and a pre-generated resulting neural network, the to-be-associated entity vectors being used for characterizing to-be-associated entities in a target knowledge graph, the resulting neural network being generated using the method according to any one embodiment of the method in the first aspect; inputting the acquired two to-be-associated entity vectors into the resulting neural network, to generate an association result for characterizing whether an association relationship between the two to-be-associated entities is a preset association relationship corresponding to the resulting neural network; and updating the target knowledge graph, in response to determining the association result indicating the association relationship between the two to-be-associated entities being the preset association relationship corresponding to the resulting neural network, using association information preset for the preset association relationship and to be added to the knowledge graph.

In some embodiments, the method further includes: displaying the updated target knowledge graph.

In a third aspect, an embodiment of the present disclosure provides an apparatus for generating a neural network, including: a first acquiring unit configured to acquire a target neural network, the target neural network corresponding to a preset association relationship, and being configured to use two entity vectors corresponding to two entities in a target knowledge graph as an input, to determine whether an association relationship between the two entities corresponding to the inputted two entity vectors is the preset association relationship, the target neural network including a relational tensor predetermined for the preset association relationship; a tensor converting unit configured to convert the relational tensor in the target neural network into a product of a target number of relationship matrices, and generate a candidate neural network including the target number of converted relationship matrices; and a network generating unit configured to generate a resulting neural network using the candidate neural network.

In some embodiments, the network generating unit includes: a sample acquiring module configured to acquire a training sample set for the preset association relationship, where the training sample set includes a positive training sample and a negative training sample, a training sample includes two sample entity vectors, the sample entity vector is used for characterizing a sample entity, an association relationship between two entities corresponding to the positive training sample is the preset association relationship, and an association relationship between two entities corresponding to the negative training sample is not the preset association relationship; and a first training module configured to select a training sample from the training sample set, and execute following training: training the candidate neural network using the selected training sample; determining whether the training the candidate neural network is completed; and determining, in response to determining the training the candidate neural network being completed, the trained candidate neural network as the resulting neural network.

In some embodiments, the network generating unit further includes: a second training module configured to reselect, in response to determining the training the candidate neural network being uncompleted, a training sample from unselected training samples included in the training sample set, adjust a parameter of the candidate neural network, and continue to execute the training using a most recently selected training sample and a most recently adjusted candidate neural network.

In some embodiments, the sample acquiring module is further configured to: acquire a positive training sample set for the preset association relationship; determine, for a positive training sample in the positive training sample set, a to-be-retained sample entity vector and a to-be-replaced sample entity vector from the positive training sample; acquire a sample entity vector for replacement for the to-be-replaced sample entity vector, where a sample entity corresponding to the sample entity vector for replacement is different from a sample entity corresponding to the to-be-replaced sample entity vector; and use the sample entity vector for replacement and the to-be-retained sample entity vector to form a negative training sample corresponding to the positive training sample; and use the positive training sample set and the formed negative training sample to form the training sample set.

In some embodiments, the apparatus further includes: a network storing module configured to store the resulting neural network.

In a fourth aspect, an embodiment of the present disclosure provides an apparatus for updating a knowledge graph, including: a second acquiring unit configured to acquire two to-be-associated entity vectors and a pre-generated resulting neural network, the to-be-associated entity vector being used for characterizing to-be-associated entities in a target knowledge graph, the resulting neural network being generated using the method according to any one embodiment of the method in the first aspect; a result generating unit configured to input the acquired two to-be-associated entity vectors into the resulting neural network, to generate an association result for characterizing whether an association relationship between the two to-be-associated entities is a preset association relationship corresponding to the resulting neural network; and a graph updating unit configured to update the target knowledge graph, in response to determining the association result indicating the association relationship between the two to-be-associated entities being the preset association relationship corresponding to the resulting neural network, using association information preset for the preset association relationship and to be added to the knowledge graph.

In some embodiments, the apparatus further includes: a graph displaying unit configured to display the updated target knowledge graph.

In a fifth aspect, an embodiment of the present disclosure provides an electronic device, including: one or more processors; and a storage apparatus, storing one or more programs thereon, where the one or more programs, when executed by the one or more processors, cause the one or more processors to implement the method according to any one embodiment of the method in the first aspect and the second aspect.

In a sixth aspect, an embodiment of the present disclosure provides a computer readable medium, storing a computer program thereon, where the program, when executed by a processor, implements the method according to any one embodiment of the method in the first aspect and the second aspect.

The method and apparatus for generating a neural network provided by some embodiments of the present disclosure acquire a target neural network, the target neural network corresponding to a preset association relationship, and being configured to use two entity vectors corresponding to two entities in a target knowledge graph as an input, to determine whether an association relationship between the two entities corresponding to the inputted two entity vectors is the preset association relationship, the target neural network including a relational tensor predetermined for the preset association relationship, then convert the relational tensor in the target neural network into a product of a target number of relationship matrices, and generate a candidate neural network including the target number of converted relationship matrices, and finally generate a resulting neural network using the candidate neural network, thereby reducing the number of parameters of the neural network by converting the relational tensor in the neural network into the product of the target number of relationship matrices, further reducing the complexity of the neural network, and facilitating reducing the CPU consumption and improving the information processing efficiency when performing information processing using the neural network.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
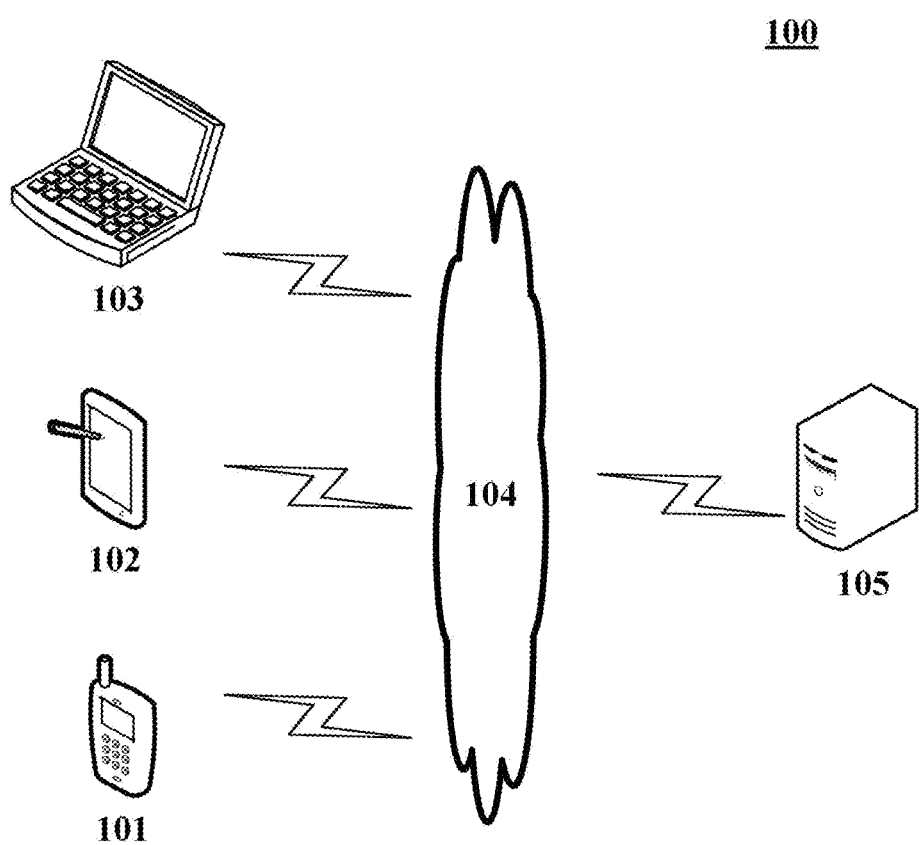
FIG. 1 is a diagram of an example system architecture in which an embodiment of the present disclosure may be implemented.

FIG. 1 shows an example system architecture 100 in which a method for generating a neural network, an apparatus for generating a neural network, a method for updating a knowledge graph, or an apparatus for updating a knowledge graph according to embodiments of the present disclosure may be applied.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical cables.

A user may interact with the server 105 using the terminal devices 101, 102, and 103 via the network 104, for example, to receive or transmit a message. The terminal devices 101, 102, and 103 may be provided with various communication client applications, such as a web browser application, a shopping application, a search application, an instant messaging tool, an mailbox client, or social platform software.

The terminal devices 101, 102, and 103 may be hardware or software. When the terminal devices 101, 102 and 103 are hardware, the terminal devices may be various electronic devices, including but not limited to a smart phone, a tablet PC, an e-book reader, an MP3 (Moving Picture Experts Group Audio Layer III) player, an MP4 (Moving Picture Experts Group Audio Layer IV) player, a laptop portable computer, or a desktop computer. When the terminal devices 101, 102, and 103 are software, the terminal devices may be installed in the above-listed electronic devices, may be implemented as a plurality of software programs or software modules (e.g., software programs or software modules configured to provide distributed services), or may be implemented as a single software program or software module. This is not specifically limited here.

The server 105 may be a server that provides various services, such as a network processing server for processing a target neural network transmitted by the terminal devices 101, 102 and 103. The network processing server can process, e.g., analyze, received data, such as the target neural network, and obtain a processing result (e.g., a resulting neural network).

It should be noted that the method for generating a neural network provided in some embodiments of the present disclosure may be executed by the terminal devices 101, 102, and 103, or be executed by the server 105. Accordingly, the apparatus for generating a neural network may be provided in the terminal devices 101, 102, and 103, or be provided in the server 105. In addition, the method for updating a knowledge graph provided in some embodiments of the present disclosure may be executed by the terminal devices 101, 102, and 103, or be executed by the server 105. Accordingly, the apparatus for updating a knowledge graph may be provided in the terminal devices 101, 102, and 103, or be provided in the server 105.

It should be noted that the server may be hardware or software. When the server is hardware, the server may be implemented as a distributed server cluster composed of a plurality of servers, or be implemented as a single server. When the server is software, the server may be implemented as a plurality of software programs or software modules (e.g., a plurality of software programs or software modules for providing distributed services), or may be implemented as a single software program or software module. This is not specifically limited here.

It should be understood that the numbers of terminal devices, networks, and servers in FIG. 1 are merely illustrative. Any number of terminal devices, networks, and servers may be provided based on actual requirements. In the case where it is not necessary to remotely acquire data for generating the resulting neural network or updating a target knowledge graph, the system architecture may not include the network, but merely includes the terminal device or the server.

Figure 2:
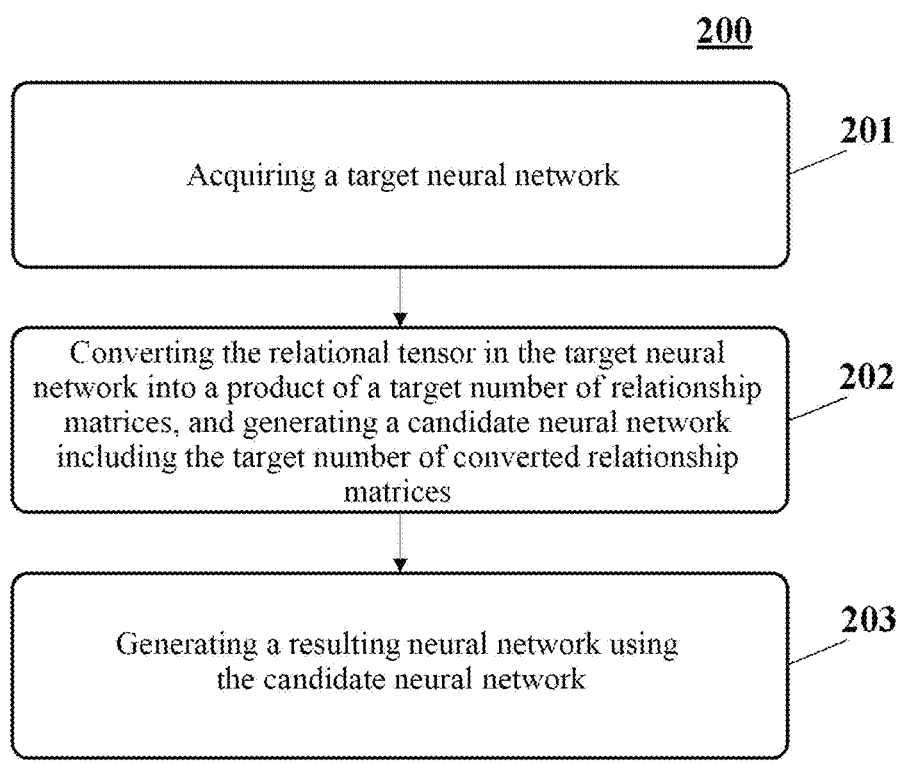
FIG. 2 is a flowchart of a method for generating a neural network according to an embodiment of the present disclosure.

Further referring to FIG. 2, a process 200 of a method for generating a neural network according to an embodiment of the present disclosure is shown. The method for generating a neural network includes the following steps.

Step 201: acquiring a target neural network.

In the present embodiment, an executing body (e.g., the server shown in FIG. 1) of the method for generating a neural network can acquire a target neural network remotely or locally through a wired or wireless connection. The target neural network is a to-be-adjusted neural network. Specifically, the target neural network may be an untrained neural network, or a trained neural network. The target neural network corresponds to a preset association relationship, and is configured to use two entity vectors corresponding to two entities in a target knowledge graph as an input, to determine whether an association relationship between the two entities corresponding to the inputted two entity vectors is the preset association relationship.

The target knowledge graph is a knowledge graph with a to-be-complemented association relationship between entities therein. The target knowledge graph may be stored in the executing body, or in other electronic devices in communicative connection with the executing body. Generally, an entity in the knowledge graph may be used for characterizing a thing or concept (e.g., characterizing a person, a place, time, or information). A form of the entity may include at least one of the following items: a numeral, a word, or a symbol. The association relationship in the knowledge graph may be characterized by a connection line between entities, and a specific content of an association relationship corresponding to two associated entities may be characterized by association information predetermined for the association relationship. The association information may include at least one of the following items: a numeral, a word, or a symbol.

As an example, the target knowledge graph includes an entity "Beijing" and an entity "China," which may include a connection line for characterizing that both have an association relationship, as well as association information for characterizing a specific content of the association relationship between the two, e.g., a word "capital."

An entity in the target knowledge graph may correspond to an entity vector. The entity vector may be used for characterizing a characteristic of the entity. In practice, the entity vector may be obtained by various approaches, for example, may be obtained by initialization, or be obtained using a pre-trained machine learning model.

The preset association relationship may be various association relationships predetermined by those skilled in the art, such as a parent-child relationship, or an inclusion relationship. The target neural network includes a relational tensor predetermined for the preset association relationship. The relational tensor may be used for characterizing a characteristic of the preset association relationship.

In practice, a tensor is a multi-dimensional data storing unit, and the data dimension is referred to as an order of the tensor. The tensor may be regarded as expansion of a vector and a matrix in a multi-dimensional space, the vector may be regarded as a one-dimensional tensor, and the matrix may be regarded as a two-dimensional tensor. Generally, during research on the tensor, the tensor may be regarded as a plurality of two-dimensional slices. Each of the slices may be regarded as a matrix.

Specifically, the executing body or other electronic devices may determine a relational tensor corresponding to the preset association relationship using various methods. For example, the relational tensor corresponding to the preset association relationship may be determined using various conventional parameter initialization methods (e.g., random initialization, or Glove algorithm). Alternatively, the relational tensor corresponding to the preset association relationship may be determined using a pre-trained model for characterizing a corresponding relationship between the association relationship and the relational tensor.

In the present embodiment, the relational tensor is used for performing operation on entity vectors of the two entities in the target knowledge graph, thereby determining whether the association relationship between the two entities in the target knowledge graph is the preset association relationship corresponding to the relational tensor. It will be appreciated that, compared with the matrix or the vector, the relational tensor has a large dimension, such that more characteristic data for characterizing characteristics of the preset association relationships may be stored using the relational tensor. However, in practice, the more are the parameters included in the neural network, the more complex will the neural network be, which will not contribute to storage or computing of the neural network.

Step 202: converting the relational tensor in the target neural network into a product of a target number of relationship matrices, and generating a candidate neural network including the target number of converted relationship matrices.

In the present embodiment, based on the target neural network obtained in step 201, the executing body can convert the relational tensor in the target neural network into a product of a target number of relationship matrices, and generate a candidate neural network including the target number of converted relationship matrices.

The relationship matrices are obtained by converting the relational tensor using a preset conversion method. The target number is determined based on the preset conversion method. It will be appreciated that, in practice, when a high-dimensional matrix is converted into a product of low-dimensional vectors, the number of elements included in the converted vectors is generally less than the number of elements included in the matrix. For example, a matrix A: [1 1 1;1 1 1;1 1 1] may be converted into a product of a vector b: $[1\ 1\ 1]^T$ and a vector c: [1 1 1]. The letter "T" is used for characterizing transposition of the vector. Thus, the matrix A includes 9 elements, and a sum of elements included in the converted two vectors is 6, i.e., the number of elements in the matrix A is greater than the number of elements included in the converted vector b and vector c. Furthermore, similarly, when a high-dimensional relational tensor is converted into a product of a target number of low-dimensional relationship matrices, the number of parameters corresponding to the preset association relationship can be reduced, thereby reducing the complexity of the neural network.

Specifically, the executing body can convert the relational tensor by various approaches, to obtain the target number of relationship matrices. For example, the executing body can first aggregate matrices corresponding to slices of the relational tensor, to construct the relational tensor into a slice matrix. Then, the slice matrix is decomposed into a product of a target number of relationship matrices. Here, the slice matrix may be decomposed by various approaches, e.g., triangular factorization, QR factorization, or singular value decomposition. It should be noted that when different decomposition methods are employed, the number (i.e., the target number) of finally obtained relationship matrices may be different. For example, two relationship matrices may be obtained from decomposition by triangular factorization; while three relationship matrices may be obtained from decomposition by singular value decomposition.

In addition, the executing body can further convert the relational tensor by other approaches. As an example, the relational tensor W includes three slices, respectively being $W_1$, $W_2$, and $W_3$. The executing body may first construct the relational tensor W into a slice matrix $W'=[W_1, W_2, W_3]$, then convert each matrix element (namely Wi, where i=1, 2,3) in the slice matrix into a product of two vectors, i.e., converting $W_1$ into $U_1^T*V_1$; converting $W_2$ into $U_2^T*V_2$; and converting $W_3$ into $U_3^T*V_3$; and then may infer:

$$W=W'=[U_1^T*V_1, U_2^T*V_2, U_3^T*V_3]=[U_1, U_2, U_3]^T*[V_1, V_2, V_3]$$

A matrix $[U_1, U_2, U_3]^T$ and a matrix $[V_1, V_2, V_3]$ are two converted relationship matrices.

For the example described above, assuming that $W_i$ is a matrix in 3×3 dimensions, then $W_i$ includes 9 parameters, and then the relational tensor W includes 27 (27=9×3) parameters. Converted $U_i^T$ corresponding to $W_i$ is a 3-dimensional column vector, including 3 parameters; and $V_i$ is a three-dimensional row vector, including 3 parameters. Therefore, the converted relationship matrix $[U_1, U_2, U_3]^T$ includes 9 parameters; and the converted relationship matrix $[V_1, V_2, V_3]$ also includes 9 parameters, i.e., after converting the relational tensor into relationship matrices, the number of parameters is 18 (18=9+9), which is less than the number (27) of parameters included in the relational tensor, thereby achieving the purpose of reducing the number of parameters in the neural network.

In the present embodiment, the candidate neural network is the target neural network obtained by replacing the relational tensor with the product of the target number of converted relationship matrices.

Step 203: generating a resulting neural network using the candidate neural network.

In the present embodiment, the executing body can generate the resulting neural network based on the candidate neural network obtained in step 202. The resulting neural network is an adjusted neural network.

Specifically, the executing body can directly determine the candidate neural network as the resulting neural network; or alternatively, can continue to adjust the candidate neural network, and determine the adjusted candidate neural network as the resulting neural network.

In some alternative implementations of the present embodiment, the executing body can generate the resulting neural network using the candidate neural network through the following steps.

Step 2031: acquiring a training sample set for the preset association relationship.

The training sample set includes a positive training sample and a negative training sample. A training sample includes two sample entity vectors. The sample entity vector is used for characterizing a sample entity. An association relationship between two entities corresponding to the positive training sample is the preset association relationship. An association relationship between two entities corresponding to the negative training sample is not the preset association relationship. For example, the preset association relationship is an inclusion relationship. For the inclusion relationship, the positive training sample may be two sample entity vectors corresponding to a sample entity "China" and a sample entity "Beijing;" and the negative training sample may be two sample entity vectors corresponding to a sample entity "Tianjin" and a sample entity "Beijing."

Specifically, the executing body can acquire the training sample set using various methods.

In some alternative implementations of the present embodiment, the executing body can acquire the training sample set through the following steps.

First, the executing body can acquire the positive training sample set for the preset association relationship.

Here, the positive training sample can be acquired using various methods, for example, two entities corresponding to the preset association relationship may be searched in a predetermined sample knowledge graph as sample entities. Then, entity vectors of the searched two entities are determined as the sample entity vectors. Finally, the determined two sample entity vectors are used to form the positive training sample.

Then, for a positive training sample in the positive training sample set, the following steps are executed: determining a to-be-retained sample entity vector and a to-be-replaced sample entity vector from the positive training sample; acquiring a sample entity vector for replacement for the to-be-replaced sample entity vector, where a sample entity corresponding to the sample entity vector for replacement is different from a sample entity corresponding to the to-be-replaced sample entity vector; and using the sample entity vector for replacement and the to-be-retained sample entity vector to form a negative training sample corresponding to the positive training sample.

Finally, the positive training sample set and the formed negative training sample are used to form the training sample set.

In the present implementation, the negative training sample is obtained by replacing the to-be-replaced sample entity vector in the positive training sample, thereby simplifying the acquisition of a training sample set, and further contributing to improving the efficiency of generating the result generating network.

Step 2032: selecting a training sample from the training sample set, and executing following training: training the candidate neural network using the selected training sample; determining whether the training the candidate neural network is completed; and determining, in response to determining the training the candidate neural network being completed, the trained candidate neural network as the resulting neural network.

Specifically, the executing body can train the candidate neural network using the selected training sample by using the machine learning method.

Here, whether the training the candidate neural network is completed may be determined based on a predetermined completion condition. When the completion condition is satisfied, the completion of training the candidate neural network may be determined. The completion condition may include, but is not limited to, at least one of the following items: a training duration exceeding a preset time length; a number of iterations of training exceeding a preset number of iterations; or a loss value obtained through computation using a loss function being less than a preset loss threshold.

In the present implementation, the resulting neural network is obtained by training the candidate neural network, thereby improving the accuracy of the obtained resulting neural network, and contributing to improving the accuracy degree of prediction using the resulting neural network.

In some alternative implementations of the present embodiment, the executing body can further reselect, in response to determining the training the candidate neural network being uncompleted, a training sample from unselected training samples included in the training sample set, adjust parameters of the candidate neural network, and continue to execute the training using a most recently selected training sample and a most recently adjusted candidate neural network.

Specifically, the executing body can adjust the parameters of the candidate neural network, in response to determining the training the candidate neural network being uncompleted, based on differences obtained through computation. Here, the parameters of the candidate neural network can be adjusted by various implementation approaches based on the differences obtained through computation. For example, the parameters of the candidate neural network can be adjusted by a back propagation (BP) algorithm or a stochastic gradient descent (SGD) algorithm.

The present implementation can achieve repeated training of the candidate neural network, thereby further improving the accuracy of the resulting neural network.

In some alternative implementations of the present embodiment, the executing body can store the resulting neural network. Here, as the resulting neural network corresponds to the target neural network, and the number of included parameters is reduced, the resulting neural network can be stored to reduce the storage space occupied by the neural network, and save the storage resource.

Figure 3:
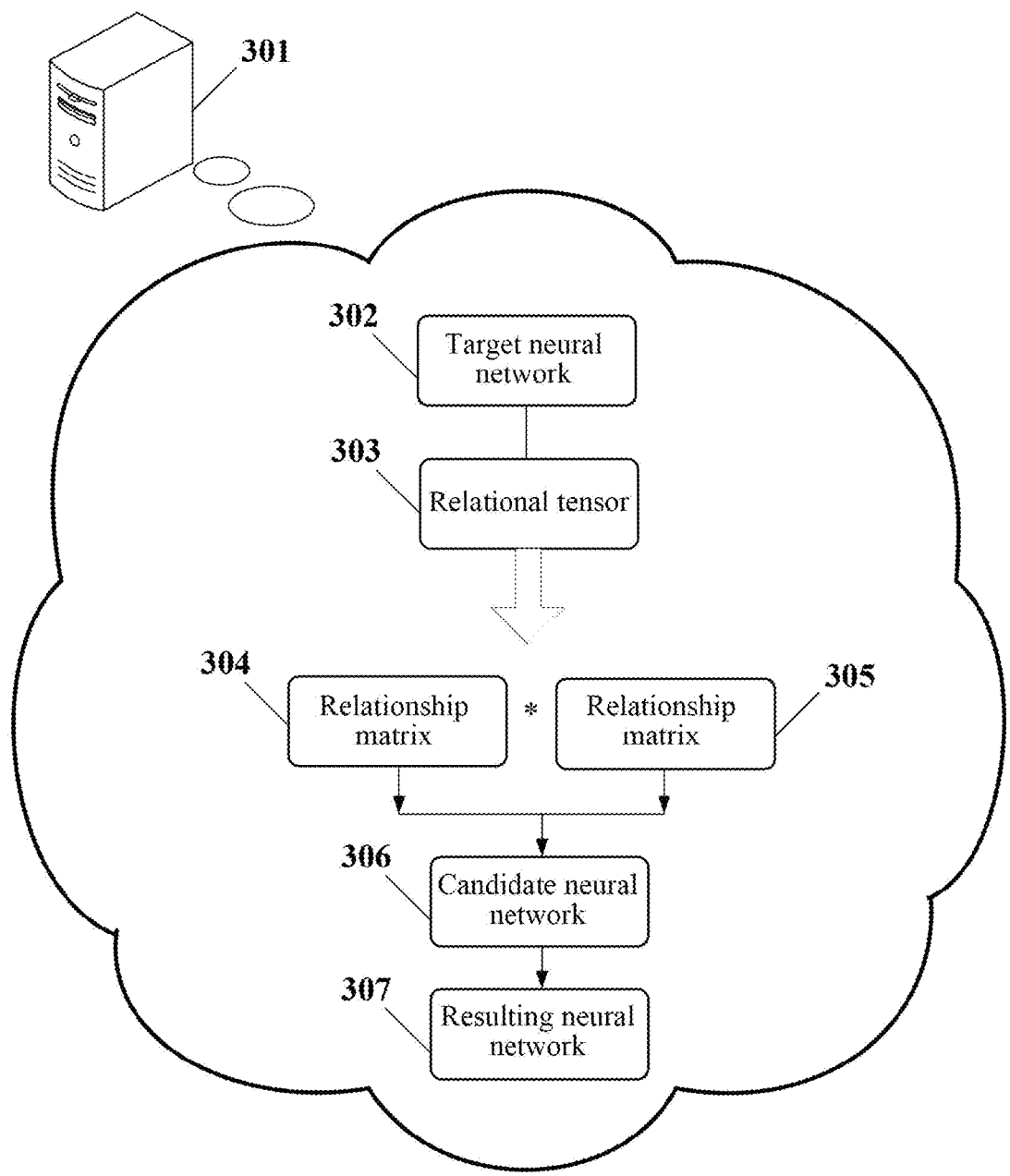
FIG. 3 is a schematic diagram of an application scenario of the method for generating a neural network according to an embodiment of the present disclosure.

Further referring to FIG. 3, FIG. 3 is a schematic diagram of an application scenario of the method for generating a neural network according to an embodiment of the present disclosure. In the application scenario of FIG. 3, the server 301 first acquires a target neural network 302. The target neural network 302 corresponds to a preset association relationship (e.g., a parent-child relationship), and is configured to use two entity vectors corresponding to two entities in a target knowledge graph as an input, to determine whether an association relationship between the two entities corresponding to the inputted two entity vectors is the preset association relationship. The target neural network 302 includes a relational tensor 303 predetermined for the preset association relationship. Then, the server 301 can convert the relational tensor 303 in the target neural network 302 into a product of a relationship matrix 304 and a relationship matrix 305, and generate a candidate neural network 306 including the converted relationship matrix 304 and the converted relationship matrix 305. Finally, the server 301 can generate a resulting neural network 307 using the candidate neural network 306.

The method provided in some embodiments of the present disclosure acquires a target neural network, the target neural network corresponding to a preset association relationship, and being configured to use two entity vectors corresponding to two entities in a target knowledge graph as an input, to determine whether an association relationship between the two entities corresponding to the inputted two entity vectors is the preset association relationship, the target neural network including a relational tensor predetermined for the preset association relationship, then converts the relational tensor in the target neural network into a product of a target number of relationship matrices, and generates a candidate neural network including the target number of converted relationship matrices, and finally generates a resulting neural network using the candidate neural network, thereby reducing the number of parameters of the neural network by converting the relational tensor in the neural network into the product of the target number of relationship matrices, further reducing the complexity of the neural network, and facilitating reducing the CPU consumption and improving the information processing efficiency when performing information processing using the neural network.

Figure 4:
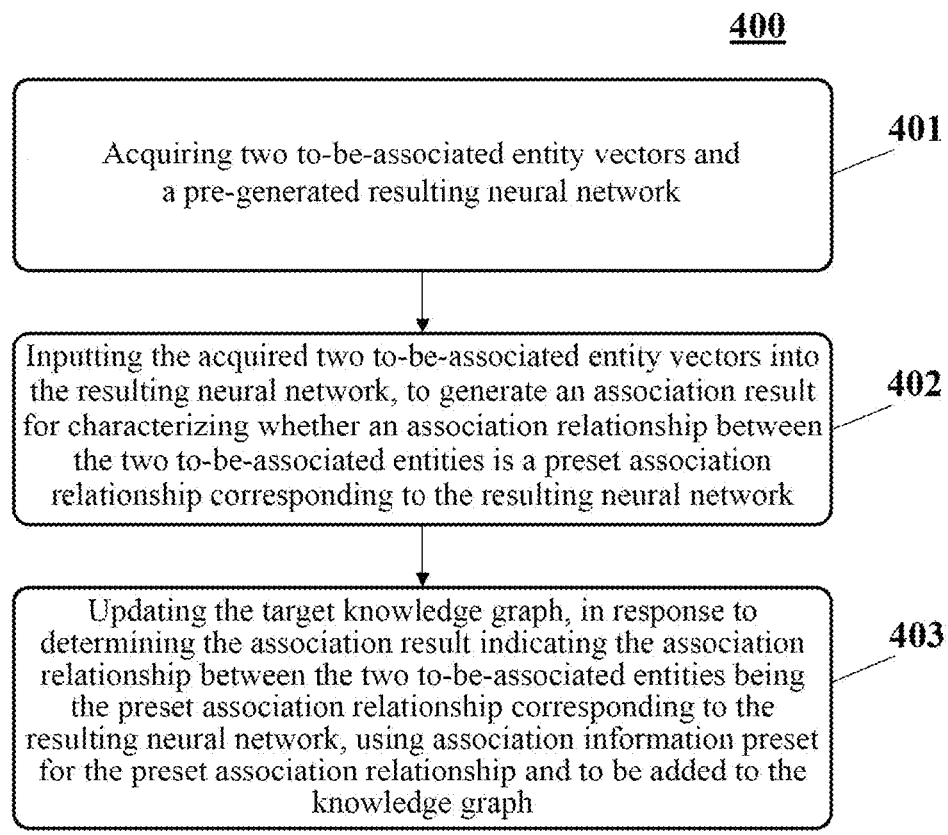
FIG. 4 is a flowchart of a method for updating a knowledge graph according to an embodiment of the present disclosure.

Further referring to FIG. 4, a process 400 of an embodiment of a method for updating a knowledge graph is shown. The process 400 of the method for updating a knowledge graph includes the following steps.

Step 401: acquiring two to-be-associated entity vectors and a pre-generated resulting neural network.

In the present embodiment, an executing body (e.g., the terminal device shown in FIG. 1) of the method for updating a knowledge graph can acquire two to-be-associated entity vectors and a pre-generated resulting neural network remotely or locally through a wired or wireless connection. The to-be-associated entity vectors are used for characterizing to-be-associated entities in a target knowledge graph. Specifically, the executing body may first extract two to-be-associated entities from the target knowledge graph, and then determine to-be-associated entity vectors of the extracted two to-be-associated entities. The method of determining an entity vector described in FIG. 2 may be referred to for the method of specifically determining the to-be-associated entity vectors corresponding to the to-be-associated entities.

In the present embodiment, the resulting neural network is generated in accordance with the method according to the corresponding embodiment of the above FIG. 2. Specifically, the steps according to the corresponding embodiment of FIG. 2 may be referred to.

Step 402: inputting the acquired two to-be-associated entity vectors into the resulting neural network, to generate an association result for characterizing whether an association relationship between the two to-be-associated entities is a preset association relationship corresponding to the resulting neural network.

In the present embodiment, based on the two to-be-associated entity vectors and the resulting neural network obtained in step 401, the executing body can input the acquired two to-be-associated entity vectors into the resulting neural network, to generate the association result for characterizing whether the association relationship between the two to-be-associated entities is the preset association relationship corresponding to the resulting neural network. The association result may include at least one of the following items: a word, a numeral, or a symbol. For example, the association result may include a word "yes" or a word "no," where the word "yes" may be used for characterizing that the association relationship between the two to-be-associated entities is the preset association relationship corresponding to the resulting neural network; and the word "no" may be used for characterizing that the association relationship between the two to-be-associated entities is not the preset association relationship corresponding to the resulting neural network.

Step 403: updating the target knowledge graph, in response to determining the association result indicating the association relationship between the two to-be-associated entities being the preset association relationship corresponding to the resulting neural network, using association information preset for the preset association relationship and to be added to the knowledge graph.

In the present embodiment, after generating the association result, the executing body can update the target knowledge graph, in response to determining the association result indicating the association relationship between the two to-be-associated entities being the preset association relationship corresponding to the resulting neural network, using the association information preset for the preset association relationship and to be added to the knowledge graph.

Specifically, the executing body can add the association information between the to-be-associated entities, to characterize a content of the association relationship between the two to-be-associated entities.

In particular, when updating the target knowledge graph, if original association information for characterizing the content of the association relationship between the two to-be-associated entities is included between two to-be-associated entities in the target knowledge graph, the executing body can replace the original association information with the association information corresponding to the preset association relationship, to achieve the updating the target knowledge graph.

In some alternative implementations of the present embodiment, after updating the target knowledge graph, the executing body can further display the updated target knowledge graph, thus intuitively displaying the updated target knowledge graph.

The method provided in some embodiments of the present disclosure can update the target knowledge graph using the resulting neural network generated using the method according to the corresponding embodiment of FIG. 2. The resulting neural network includes fewer parameters, compared with a tensor neural network for updating the knowledge graph in the prior art. Thus, the resulting neural network can be used to reduce the computing complexity, thereby reducing the CPU consumption, and improving the efficiency of updating the knowledge graph.

Figure 5:
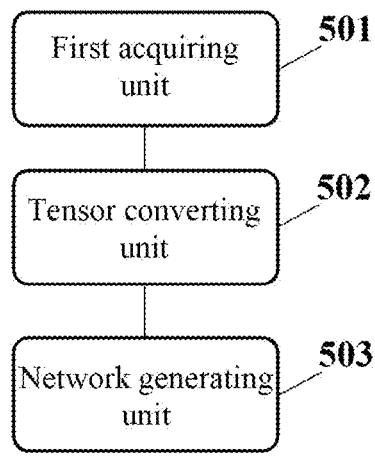
FIG. 5 is a schematic structural diagram of an apparatus for generating a neural network according to an embodiment of the present disclosure.

Further referring to FIG. 5, as an implementation of the method shown in the above FIG. 2, an embodiment of the present disclosure provides an apparatus for generating a neural network. An embodiment of the apparatus may correspond to the embodiment of the method shown in FIG. 2. The apparatus may be specifically applied to various electronic devices.

As shown in FIG. 5, the apparatus 500 for generating a neural network of the present embodiment includes: a first acquiring unit 501, a tensor converting unit 502, and a network generating unit 503. The first acquiring unit 501 is configured to acquire a target neural network, the target neural network corresponding to a preset association relationship, and being configured to use two entity vectors corresponding to two entities in a target knowledge graph as an input, to determine whether an association relationship between the two entities corresponding to the inputted two entity vectors is the preset association relationship, the target neural network including a relational tensor predetermined for the preset association relationship; the tensor converting unit 502 is configured to convert the relational tensor in the target neural network into a product of a target number of relationship matrices, and generate a candidate neural network including the target number of converted relationship matrices; and the network generating unit 503 is configured to generate a resulting neural network using the candidate neural network.

In the present embodiment, the first acquiring unit 501 of the apparatus for generating a neural network can acquire the target neural network remotely or locally through a wired or wireless connection. The target neural network is a to-be-adjusted neural network. Specifically, the target neural network may be an untrained neural network, or a trained neural network. The target neural network corresponds to a preset association relationship, and is configured to use two entity vectors corresponding to two entities in a target knowledge graph as an input, to determine whether an association relationship between the two entities corresponding to the inputted two entity vectors is the preset association relationship.

The preset association relationship may be various association relationships predetermined by those skilled in the art, such as a parent-child relationship, or an inclusion relationship. The target neural network includes a relational tensor predetermined for the preset association relationship. The relational tensor may be used for characterizing the preset association relationship.

In the present embodiment, based on the target neural network obtained by the first acquiring unit 501, the tensor converting unit 502 can convert the relational tensor in the target neural network into a product of a target number of relationship matrices, and generate a candidate neural network including the target number of converted relationship matrices. The relationship matrix is a matrix obtained by converting the relational tensor using a preset conversion method. The target number is a number determined based on the preset conversion method.

In the present embodiment, the candidate neural network is the target neural network obtained by replacing the relational tensor with the product of the target number of converted relationship matrices.

In the present embodiment, the network generating unit 503 can generate the resulting neural network based on the candidate neural network obtained by the tensor converting unit 502. The resulting neural network is an adjusted neural network.

In some alternative implementations of the present embodiment, the network generating unit 503 may include: a sample acquiring module (not shown in the figure) configured to acquire a training sample set for the preset association relationship, where the training sample set includes a positive training sample and a negative training sample, a training sample includes two sample entity vectors, the sample entity vector is used for characterizing a sample entity, an association relationship between two entities corresponding to the positive training sample is the preset association relationship, and an association relationship between two entities corresponding to the negative training sample is not the preset association relationship; and a first training module (not shown in the figure) configured to select a training sample from the training sample set, and execute following training: training the candidate neural network using the selected training sample; determining whether the training the candidate neural network is completed; and determining, in response to determining the training the candidate neural network being completed, the trained candidate neural network as the resulting neural network.

In some alternative implementations of the present embodiment, the network generating unit 503 may further include: a second training module (not shown in the figure) configured to reselect, in response to determining the training the candidate neural network being uncompleted, a training sample from unselected training samples included in the training sample set, adjust a parameter of the candidate neural network, and continue to execute the training using a most recently selected training sample and a most recently adjusted candidate neural network.

In some alternative implementations of the present embodiment, the sample acquiring module may be further configured to: acquire a positive training sample set for the preset association relationship; determine, for a positive training sample in the positive training sample set, a to-be-retained sample entity vector and a to-be-replaced sample entity vector from the positive training sample; acquire a sample entity vector for replacement for the to-be-replaced sample entity vector, where a sample entity corresponding to the sample entity vector for replacement is different from a sample entity corresponding to the to-be-replaced sample entity vector; and use the sample entity vector for replacement and the to-be-retained sample entity vector to form a negative training sample corresponding to the positive training sample; and use the positive training sample set and the formed negative training sample to form the training sample set.

In some alternative implementations of the present embodiment, the apparatus 500 may further include: a network storing unit (not shown in the figure) configured to store the resulting neural network.

It should be understood that the units disclosed in the apparatus 500 may correspond to the steps in the method described with reference to FIG. 2. Therefore, the operations, features, and resulting benefiting effects described above for the method also apply to the apparatus 500 and the units included therein. The description will not be repeated here.

The apparatus 500 provided in the above embodiments of the present disclosure acquires a target neural network, the target neural network corresponding to a preset association relationship, and being configured to use two entity vectors corresponding to two entities in a target knowledge graph as an input, to determine whether an association relationship between the two entities corresponding to the inputted two entity vectors is the preset association relationship, the target neural network including a relational tensor predetermined for the preset association relationship, then converts the relational tensor in the target neural network into a product of a target number of relationship matrices, and generates a candidate neural network including the target number of converted relationship matrices, and finally generates a resulting neural network using the candidate neural network, thereby reducing the number of parameters of the neural network by converting the relational tensor in the neural network into the product of the target number of relationship matrices, further reducing the complexity of the neural network, and facilitating reducing the CPU consumption and improving the information processing efficiency when performing information processing using the neural network.

Figure 6:
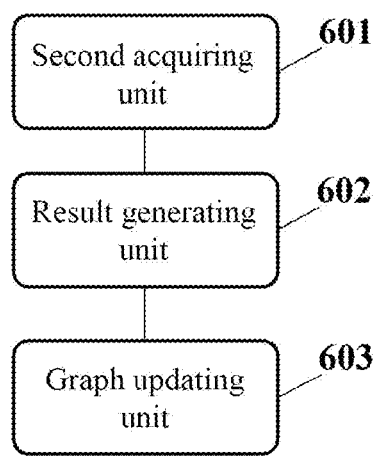
FIG. 6 is a schematic structural diagram of an apparatus for updating a knowledge graph according to an embodiment of the present disclosure.

Further referring to FIG. 6, as an implementation of the method shown in the above FIG. 4, an embodiment of the present disclosure provides an apparatus for updating a knowledge graph. An embodiment of the apparatus may correspond to the embodiment of the method shown in FIG. 4. The apparatus may be specifically applied to various electronic devices.

As shown in FIG. 6, the apparatus 600 for updating a knowledge graph according to the present embodiment includes: a second acquiring unit 601, a result generating unit 602, and a graph updating unit 603. The second acquiring unit 601 is configured to acquire two to-be-associated entity vectors and a pre-generated resulting neural network, the to-be-associated entity vector being used for characterizing to-be-associated entities in a target knowledge graph, the resulting neural network being generated using the method according to the corresponding embodiment of FIG. 2; the result generating unit 602 is configured to input the acquired two to-be-associated entity vectors into the resulting neural network, to generate an association result for characterizing whether an association relationship between the two to-be-associated entities is a preset association relationship corresponding to the resulting neural network; and the graph updating unit 603 is configured to update the target knowledge graph, in response to determining the association result indicating the association relationship between the two to-be-associated entities being the preset association relationship corresponding to the resulting neural network, using association information preset for the preset association relationship and to be added to the knowledge graph.

In the present embodiment, the second acquiring unit 601 of the apparatus 600 for updating a knowledge graph can acquire two to-be-associated entity vectors and a pre-generated resulting neural network remotely or locally through a wired or wireless connection. The to-be-associated entity vectors are used for characterizing to-be-associated entities in the target knowledge graph.

In the present embodiment, the resulting neural network is generated in accordance with the method according to the corresponding embodiment of the above FIG. 2. Specifically, the steps according to the corresponding embodiment of FIG. 2 may be referred to.

In the present embodiment, based on the two to-be-associated entity vectors and the resulting neural network obtained by the second acquiring unit 601, the result generating unit 602 can input the acquired two to-be-associated entity vectors into the resulting neural network, to generate the association result for characterizing whether the association relationship between the two to-be-associated entities is the preset association relationship corresponding to the resulting neural network. The association result may include at least one of the following items: a word, a numeral, or a symbol.

In the present embodiment, the graph updating unit 603 can update the target knowledge graph, in response to determining the association result indicating the association relationship between the two to-be-associated entities being the preset association relationship corresponding to the resulting neural network, using the association information preset for the preset association relationship and to be added to the knowledge graph.

In some alternative implementations of the present embodiment, the apparatus 600 may further include: a graph displaying unit (not shown in the figure) configured to display the updated target knowledge graph.

It should be understood that the units disclosed in the apparatus 600 may correspond to the steps in the method described with reference to FIG. 4. Therefore, the operations, features, and resulting benefiting effects described above for the method also apply to the apparatus 600 and the units included therein. The description will not be repeated here.

The apparatus 600 provided in the above embodiments of the present disclosure can update the target knowledge graph using the resulting neural network generated using the method according to the corresponding embodiment of FIG. 2. The resulting neural network includes fewer parameters, compared with a tensor neural network for updating the knowledge graph in the prior art. Thus, the resulting neural network can be used to reduce the computing complexity, thereby reducing the CPU consumption, and improving the efficiency of updating the knowledge graph.

Figure 7:
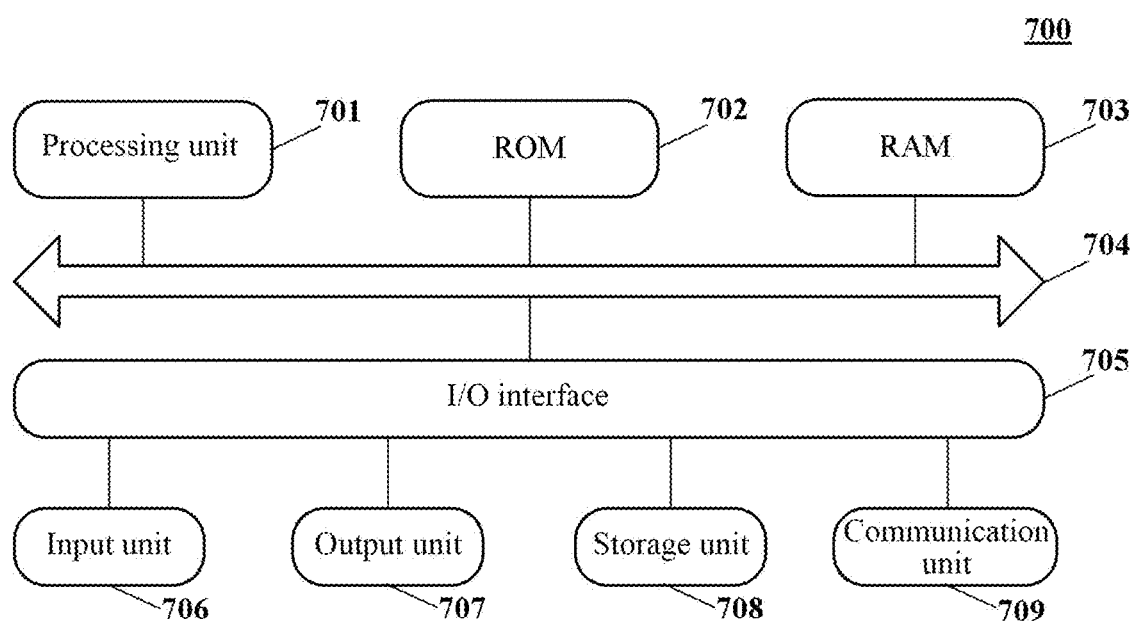
FIG. 7 is a schematic structural diagram of a computer system adapted to implement an electronic device of embodiments of the present disclosure.

Referring to FIG. 7 below, a schematic structural diagram of an electronic device 700 (e.g., the terminal device or the server in FIG. 1) adapted to implement embodiments of the present disclosure is shown. The terminal device in the embodiment of the present disclosure may include, but is not limited to, mobile terminals such as a mobile phone, a notebook computer, a digital broadcast receiver, a PDA (personal digital assistant), a PAD (tablet PC), a PMP (portable multimedia player), or a vehicle terminal (e.g., a vehicle navigation terminal), or fixed terminals such as a digital TV set, and a desktop computer. The electronic device shown in FIG. 7 is merely an example, and should not limit the functions and scope of use of some embodiments of the present disclosure.

As shown in FIG. 7, the electronic device 700 may include a processing unit (e.g., a central processing unit, or a graphics processor) 701, which may execute various appropriate actions and processes in accordance with a program stored in a read only memory (ROM) 702 or a program loaded into a random access memory (RAM) 703 from a storage unit 708. The RAM 703 further stores various programs and data required by operations of the electronic device 700. The processing unit 701, the ROM 702 and the RAM 703 are connected to each other through a bus 704. An input/output (I/O) interface 705 is also connected to the bus 704.

In general, the following units may be connected to the I/O interface 705: an input unit 606 including a touch screen, a touch pad, a keyboard, a mouse, a camera, a microphone, an accelerometer, a gyroscope, or the like; an output unit 707 including a liquid crystal display device (LCD), a speaker, a vibrator, or the like; a storage unit 708 including a magnetic tape, a hard disk, or the like; and a communication unit 709. The communication unit 709 may allow the electronic device 700 to exchange data with other devices through wireless or wired communication. While FIG. 7 shows the electronic device 700 having various units, it should be understood that it is not necessary to implement or provide all of the units shown in the figure. More or fewer units may be alternatively implemented or provided.

In particular, according to some embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method illustrated in the flow chart. In such an embodiment, the computer program may be downloaded and installed from a network via the communication unit 709, or be installed from the storage unit 708, or be installed from the ROM 702. The computer program, when executed by the processing unit 701, executes the functions as defined by the method of some embodiments of the present disclosure.

It should be noted that the computer readable medium according to the present disclosure may be a computer readable signal medium or a computer readable storage medium, or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the present disclosure, the computer readable storage medium may be any tangible medium containing or storing programs which may be used by, or used in combination with, a command execution system, apparatus or element. In the present disclosure, the computer readable signal medium may include data signal in the base band or propagating as parts of a carrier wave, in which computer readable program codes are carried. The propagating data signal may take various forms, including but not limited to an electromagnetic signal, an optical signal, or any suitable combination of the above. The computer readable signal medium may further be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium, including but not limited to: wire, optical cable, RF (radio frequency) medium etc., or any suitable combination of the above.

The computer readable medium may be included in the above electronic device; or a stand-alone computer readable medium without being assembled into the electronic device. The computer readable medium stores one or more programs. The one or more programs, when executed by the electronic device, cause the electronic device to: acquire a target neural network, the target neural network corresponding to a preset association relationship, and being configured to use two entity vectors corresponding to two entities in a target knowledge graph as an input, to determine whether an association relationship between the two entities corresponding to the inputted two entity vectors is the preset association relationship, the target neural network including a relational tensor predetermined for the preset association relationship; convert the relational tensor in the target neural network into a product of a target number of relationship matrices, and generate a candidate neural network including the target number of converted relationship matrices; and generate a resulting neural network using the candidate neural network.

In addition, the one or more programs, when executed by the electronic device, can further cause the electronic device to: acquire two to-be-associated entity vectors and a pre-generated resulting neural network, the to-be-associated entity vector being used for characterizing to-be-associated entities in a target knowledge graph, the resulting neural network being generated using the method of any one embodiment of the corresponding embodiments of FIG. 2; input the acquired two to-be-associated entity vectors into the resulting neural network, to generate an association result for characterizing whether an association relationship between the two to-be-associated entities is a preset association relationship corresponding to the resulting neural network; and update the target knowledge graph, in response to determining the association result indicating the association relationship between the two to-be-associated entities being the preset association relationship corresponding to the resulting neural network, using association information preset for the preset association relationship and to be added to the knowledge graph.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language, or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software or hardware.

The names of the units do not constitute a limitation to such units themselves in some cases. For example, the first acquiring unit may be further described as "a unit configured to acquire a target neural network."

The above description only provides an explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure, for example, technical solutions formed by the above-described features being interchanged with, but not limited to, technical features with similar functions disclosed in the present disclosure.

What is claimed is:

1. A method for generating a neural network, comprising:
acquiring a target neural network, the target neural network corresponding to a preset association relationship and being configured to use two inputted entity vectors corresponding to two entities in a target knowledge graph as an input;
determining whether an association relationship between the two entities corresponding to the two inputted entity vectors is the preset association relationship, the target neural network comprising a relational tensor predetermined for the preset association relationship;
converting the relational tensor in the target neural network into a product of a target number of relationship matrices;
generating a candidate neural network comprising the target number of relationship matrices; and
generating a resulting neural network using the candidate neural network, wherein converting the relational tensor in the target neural network into the product of the target number of relationship matrices comprises:
by using a preset conversion method, converting the relational tensor in the target neural network into the product of the target number, determined based on the preset conversion method, of relationship matrices, such that a summed number of elements in the target number of relationship matrices is less than a number of elements in the relational tensor.

2. The method according to claim 1, wherein the generating of the resulting neural network using the candidate neural network comprises:
acquiring a training sample set for the preset association relationship, wherein:
the training sample set comprises a positive training sample and a negative training sample,
a training sample comprises two sample entity vectors,
a sample entity vector is used for characterizing a sample entity,
the association relationship between the two entities corresponding to the positive training sample is the preset association relationship, and
the association relationship between the two entities corresponding to the negative training sample is not the preset association relationship; and
selecting a training sample from the training sample set; and
executing following training:
training the candidate neural network using the selected training sample;
determining whether the training the candidate neural network is completed; and
determining, in response to determining the training the candidate neural network being completed, the trained candidate neural network as the resulting neural network.

3. The method according to claim 2, wherein the generating the resulting neural network using the candidate neural network further comprises:
reselecting, in response to determining the training the candidate neural network being uncompleted, another training sample from unselected training samples comprised in the training sample set,
adjusting a parameter of the candidate neural network, and
continuing to execute the training using a most recently selected training sample and a most recently adjusted candidate neural network.

4. The method according to claim 2, wherein the acquiring of the training sample set for the preset association relationship comprises:
acquiring the positive training sample set for the preset association relationship;
determining, for the positive training sample in the positive training sample set, a to-be-retained sample entity vector and a to-be-replaced sample entity vector from the positive training sample;
acquiring a new sample entity vector from the positive training sample set for replacement for the to-be-replaced sample entity vector, wherein the sample entity corresponding to the new sample entity vector for replacement is different from the sample entity corresponding to the to-be-replaced sample entity vector; and
using the new sample entity vector for replacement and the to-be-retained sample entity vector to form the negative training sample corresponding to the positive training sample; and
using the positive training sample set and the formed negative training sample to form the training sample set.

5. The method according to claim 1, wherein the method further comprises:
storing the resulting neural network.

6. A method for updating a knowledge graph, comprising:
acquiring two to-be-associated entity vectors and a pre-generated resulting neural network, the two to-be-associated entity vectors being used for characterizing two to-be-associated entities in the target knowledge graph, the pre-generated resulting neural network being generated using the method according to claim 1;
inputting the two to-be-associated entity vectors into the pre-generated resulting neural network, to generate an association result for characterizing whether an association relationship between the two to-be-associated entities is the preset association relationship corresponding to the pre-generated resulting neural network; and
updating the target knowledge graph, in response to determining the association result indicating the association relationship between the two to-be-associated entities being the preset association relationship corresponding to the pre-generated resulting neural network, using association information preset for the preset association relationship and to be added to the knowledge graph.

7. The method according to claim 6, wherein the method further comprises:
   displaying the updated target knowledge graph.

8. An apparatus for generating a neural network, comprising:
   at least one processor; and
   a memory storing instructions, the instructions stored in memory, when executed by the at least one processor, cause the at least one processor to perform operations, the operations comprising:
   acquiring a target neural network, the target neural network corresponding to a preset association relationship and being configured to use two inputted entity vectors corresponding to two entities in a target knowledge graph as an input;
   determining whether an association relationship between the two entities corresponding to the inputted two entity vectors is the preset association relationship, the target neural network comprising a relational tensor predetermined for the preset association relationship;
   converting the relational tensor in the target neural network into a product of a target number of relationship matrices;
   generating a candidate neural network comprising the target number of relationship matrices; and
   generating a resulting neural network using the candidate neural network, wherein converting the relational tensor in the target neural network into the product of the target number of relationship matrices comprises:
      by using a preset conversion method, converting the relational tensor in the target neural network into the product of the target number, determined based on the preset conversion method, of relationship matrices, such that a summed number of elements in the target number of relationship matrices is less than a number of elements in the relational tensor.

9. The apparatus according to claim 8, wherein the generating the resulting neural network using the candidate neural network comprises:
   acquiring a training sample set for the preset association relationship, wherein:
      the training sample set comprises a positive training sample and a negative training sample,
      a training sample comprises two sample entity vectors,
      a sample entity vector is used for characterizing a sample entity, and
      the association relationship between the two entities corresponding to the positive training sample is the preset association relationship,
      and the association relationship between the two entities corresponding to the negative training sample is not the preset association relationship; and
   selecting a training sample from the training sample set, and
   executing following training:
      training the candidate neural network using the selected training sample;
      determining whether the training the candidate neural network is completed; and
      determining, in response to determining the training the candidate neural network being completed, the trained candidate neural network as the resulting neural network.

10. The apparatus according to claim 9, wherein the generating the resulting neural network using the candidate neural network further comprises:
    reselecting, in response to determining the training the candidate neural network being uncompleted, another training sample from unselected training samples comprised in the training sample set,
    adjusting a parameter of the candidate neural network, and
    continuing to execute the training using a most recently selected training sample and a most recently adjusted candidate neural network.

11. The apparatus according to claim 9, wherein the acquiring of the training sample set for the preset association relationship comprises:
    acquiring the positive training sample set for the preset association relationship;
    determining, for the positive training sample in the positive training sample set, a to-be-retained sample entity vector and a to-be-replaced sample entity vector from the positive training sample;
    acquiring a new sample entity vector for replacement for the to-be-replaced sample entity vector, wherein a sample entity corresponding to the new sample entity vector for replacement is different from the sample entity corresponding to the to-be-replaced sample entity vector; and
    using the new sample entity vector for replacement and the to-be-retained sample entity vector to form the negative training sample corresponding to the positive training sample; and
    using the positive training sample set and the formed negative training sample to form the training sample set.

12. The apparatus according to claim 8, wherein the operations further comprise:
    storing the resulting neural network.

13. An apparatus for updating a knowledge graph, comprising:
    at least one processor; and
    a memory storing instructions, the instructions when executed by the at least one processor, cause the at least one processor to perform operations, the operations comprising:
       acquiring two to-be-associated entity vectors and a pre-generated resulting neural network, the two to-be-associated entity vectors being used for characterizing two to-be-associated entities in the target knowledge graph, the resulting neural network being generated using the method according to claim 1;
       inputting the two to-be-associated entity vectors into the resulting neural network, to generate an association result for characterizing whether an association relationship between the two to-be-associated entities is a preset association relationship corresponding to the resulting neural network; and
       updating the target knowledge graph, in response to determining the association result indicating the association relationship between the two to-be-associated entities being the preset association relationship corresponding to the resulting neural network, using association information preset for the preset association relationship and to be added to the knowledge graph.

14. The apparatus according to claim 13, wherein the operations further comprise:
    displaying the updated target knowledge graph.

15. A non-transitory computer readable medium, storing a computer program thereon, wherein the computer program, when executed by a processor, causes the processor to perform the method according to claim 1.

\* \* \* \* \*